US010120259B2

(12) United States Patent
Kato

(10) Patent No.: US 10,120,259 B2
(45) Date of Patent: *Nov. 6, 2018

(54) BALANCED MACH-ZEHNDER MODULATOR

(71) Applicant: INPHI CORPORATION, Santa Clara, CA (US)

(72) Inventor: Masaki Kato, Palo Alto, CA (US)

(73) Assignee: INPHI CORPORATION, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/812,551

(22) Filed: Nov. 14, 2017

(65) Prior Publication Data

US 2018/0067375 A1 Mar. 8, 2018

Related U.S. Application Data

(63) Continuation of application No. 15/459,528, filed on Mar. 15, 2017, now Pat. No. 9,846,347, which is a (Continued)

(51) Int. Cl.
*G02F 1/21* (2006.01)
*G02F 1/025* (2006.01)
*G02F 1/225* (2006.01)

(52) U.S. Cl.
CPC ............ *G02F 1/2257* (2013.01); *G02F 1/025* (2013.01); *G02F 2001/212* (2013.01); *G02F 2201/121* (2013.01); *G02F 2201/126* (2013.01)

(58) Field of Classification Search
CPC ................................................ G02F 2001/212
See application file for complete search history.

(56) References Cited

U.S. PATENT DOCUMENTS 5,592,612 A  1/1997  Birk
6,128,094 A  10/2000 Smith
(Continued)

OTHER PUBLICATIONS

Office Action for U.S. Appl. No. 13/653,373, dated Mar. 27, 2014.
(Continued)

*Primary Examiner* — Michelle R Connelly
(74) *Attorney, Agent, or Firm* — Richard T. Ogawa; Ogawa P.C.

(57) ABSTRACT

An apparatus for modulating a beam of light with balanced push-pull mechanism. The apparatus includes a first waveguide comprising a first PN junction on a substrate and a second waveguide comprising a second PN junction on the silicon-on-insulator substrate. The second PN junction is a replica of the first PN junction shifted with a distance. The apparatus further includes a first source electrode and a first ground electrode coupled respectively with the first PN junction and a second source electrode and a second ground electrode coupled respectively with the second PN junction. The apparatus additionally includes a third ground electrode disposed near the second PN junction at the distance away from the second ground electrode, wherein the first ground electrode, the second ground electrode, and the third ground electrode are commonly grounded to have both PN junctions subjected to a substantially same electric field varied in ground-source-ground pattern.

17 Claims, 5 Drawing Sheets

Related U.S. Application Data continuation of application No. 14/640,903, filed on Mar. 6, 2015, now Pat. No. 9,632,390.

(56) References Cited

U.S. PATENT DOCUMENTS

| | | | |
|---|---|---|---|
| 6,400,621 B2 | 6/2002 | Hidaka et al. | |
| 6,542,956 B1 | 4/2003 | Lee et al. | |
| 6,993,701 B2 | 1/2006 | Corbett et al. | |
| 7,656,727 B2 | 2/2010 | Thayer | |
| 7,990,746 B2 | 8/2011 | Rajan | |
| 8,325,554 B2 | 12/2012 | Sweere et al. | |
| 8,687,451 B2 | 4/2014 | Wang | |
| 9,632,390 B1 * | 4/2017 | Kato | G02F 1/2257 |
| 9,846,347 B2 * | 12/2017 | Kato | G02F 1/2257 |
| 2004/0123029 A1 | 6/2004 | Dalal et al. | |
| 2006/0200697 A1 | 9/2006 | Ito | |
| 2008/0104290 A1 | 5/2008 | Cowell et al. | |
| 2008/0183959 A1 | 7/2008 | Pelley et al. | |
| 2009/0141558 A1 | 6/2009 | Sarin et al. | |
| 2009/0300259 A1 | 12/2009 | Luo et al. | |
| 2010/0005212 A1 | 1/2010 | Gower et al. | |
| 2010/0162037 A1 | 6/2010 | Maule et al. | |
| 2010/0199125 A1 | 8/2010 | Reche | |
| 2010/0274952 A1 | 10/2010 | Lee | |
| 2011/0072200 A1 | 3/2011 | Lee et al. | |
| 2011/0125990 A1 | 5/2011 | Khosravi et al. | |
| 2011/0170329 A1 | 7/2011 | Kang | |
| 2012/0151294 A1 | 6/2012 | Yoo et al. | |
| 2012/0243299 A1 | 9/2012 | Shau | |
| 2012/0257459 A1 | 10/2012 | Berke | |
| 2012/0297231 A1 | 11/2012 | Qawami et al. | |
| 2013/0060996 A1 | 3/2013 | Berke | |

OTHER PUBLICATIONS

Notice of Allowance for U.S. Appl. No. 13/558,332, dated Feb. 25, 2014.
Office Action for U.S. Appl. No. 13/620,288, dated Oct. 1, 2013.
Office Action for U.S. Appl. No. 13/791,814, dated May 1, 2014.
Office Action for U.S. Appl. No. 13/619,692, dated May 14, 2014.
Office Action for U.S. Appl. No. 13/620,288, dated May 15, 2014.
Office Action for U.S. Appl. No. 13/791,807, dated May 29, 2014.
Office Action for U.S. Appl. No. 14/178,241, dated Jun. 27, 2014.

* cited by examiner

BALANCED MACH-ZEHNDER MODULATOR

CROSS-REFERENCES TO RELATED APPLICATIONS

The present application is a continuation of and claims priority to U.S. patent application Ser. No. 15/459,528, filed Mar. 15, 2017, which claims priority to U.S. patent application Ser. No. 14/640,903, filed Mar. 6, 2015, now issued as U.S. Pat. No. 9,632,390 on Apr. 25, 2017, all commonly assigned and hereby incorporated by references for all purposes.

BACKGROUND OF THE INVENTION

The present invention relates to electro-optic modulation devices and methods. More particularly, the present invention provides an improved silicon-based Mach-Zehnder modulator and methods for balancing two Mach-Zehnder arms based on silicon photonic design platform.

Over the last few decades, the use of communication networks exploded. In the early days Internet, popular applications were limited to emails, bulletin board, and mostly informational and text-based web page surfing, and the amount of data transferred was usually relatively small. Today, Internet and mobile applications demand a huge amount of bandwidth for transferring photo, video, music, and other multimedia files. For example, a social network like Facebook processes more than 500 TB of data daily. With such high demands on data and data transfer, existing data communication systems need to be improved to address these needs.

Over the past, high data rate communication has been widely implemented via optical network, in which data signals are carried by laser light that is specifically modulated using various kinds of electro-optic modulators. Mach-Zhedner modulator is a widely used electro-optic modulator often driven by a push-pull driver (or differential driver) for relieving swing voltage requirements and power consumption. For push-pull (or differential) drive, the balance between two Mach-Zehnder phase modulation arms is very important. But the performance of conventional modulator is sensitive to unbalance of two modulation arms caused by implant mask misalignment due to the use of mirror symmetric implant mask and doping profile (i.e. 'p-n n-p' or 'n-p p-n'). Therefore, an improved Mach-Zehnder modulator and methods for balancing two Mach-Zehnder modulation arms based on silicon photonics platform regardless of implant mask misalignment are desired.

BRIEF SUMMARY OF THE INVENTION

The present invention relates to electro-optic modulation devices and methods. Various embodiments of the present invention provide a silicon-based Mach-Zhedner modulator with balanced two arms. More specifically, the invention provides a Mach-Zhedner modulator including repeated p-n or n-p doping pattern to maintain balance for two modulation arms regardless of implant mask misalignment. In certain embodiments, the invention is applied for high bandwidth optical communication, though other applications are possible.

In modern electrical interconnect systems, high-speed serial links have replaced parallel data buses, and serial link speed is rapidly increasing due to the evolution of CMOS technology. Internet bandwidth doubles almost every two years following Moore's Law. But Moore's Law is coming to an end in the next decade. Standard CMOS silicon transistors will stop scaling around 5 nm. And the internet bandwidth increasing due to process scaling will plateau. But Internet and mobile applications continuously demand a huge amount of bandwidth for transferring photo, video, music, and other multimedia files. This disclosure describes techniques and methods to improve the communication bandwidth beyond Moore's law.

Serial link performance is limited by the channel electrical bandwidth and the electronic components. In order to resolve the inter-symbol interference (ISI) problems caused by bandwidth limitations, we need to bring all electrical components as close as possible to reduce the distance or channel length among them. Stacking chips into so-called 3-D ICs promises a one-time boost in their capabilities, but it's very expensive. Another way to achieve this goal in this disclosure is to use multiple chip module technology.

In an example, an alternative method to increase the bandwidth is to move the optical devices close to electrical device. Silicon photonics is an important technology for moving optics closer to silicon. For example, electric signal can be converted to optical signal by one or more silicon photonic-based electro-optic modulation devices in which a signal-controlled element exhibiting the electro-optic effect is used to modulate a beam of light. In this patent application, we will disclose an improved electro-optic modulator utilized for high speed telecommunication.

In a specific embodiment, the present invention provides an apparatus for modulating a beam of light. The apparatus includes a first waveguide comprising a first PN junction of a first p-type region interfaced with a first n-type region on a substrate. Additionally, the apparatus includes a second waveguide comprising a second PN junction of a second p-type region interfaced with a second n-type region on the substrate. The second PN junction is a replica of the first PN junction shifted with a distance. The apparatus further includes a first source electrode and a first ground electrode coupled respectively with either the first p-type region or the first n-type region of the first PN junction. Furthermore, the apparatus includes a second source electrode and a second ground electrode coupled respectively with the second p-type region and the second n-type region of the second PN junction. Moreover, the apparatus includes a third ground electrode disposed near the second PN junction at the distance away from the second ground electrode. The first ground electrode, the second ground electrode, and the third ground electrode are commonly grounded to have both PN junctions subjected to a substantially same electric field varied in ground-source-ground pattern.

In another specific embodiment, the present invention provides a method for manufacturing a linear Mach-Zhedner modulator with balanced arms. The method includes providing a substrate and forming a first linear waveguide and a second linear waveguide in the substrate. The second linear waveguide is in parallel to the first linear waveguide with a laterally shifted distance. Additionally, the method includes forming a first PN junction in the first linear waveguide and a second PN junction in the second linear waveguide. The first PN junction and the second PN junction have a substantially identical repeated p-n p-n doing profile along one direction of the laterally shifted distance. The method further includes forming a first ground electrode and a first source electrode to couple with the first PN junction and forming a second ground electrode and a second source electrode at the laterally shifted distance away to couple with the second PN junction. Furthermore, the method includes forming a third ground electrode at another laterally shifted distance away from the second ground electrode beyond the second PN junction. The third ground electrode is commonly grounded with both the first ground electrode and the second ground electrode for imposing an electric field across both the first PN junction and the second PN junction by a substantially same ground-source-ground pattern.

In an alternative embodiment, the present invention provides a method for balancing two arms of a Mach-Zhedner modulator. The method includes providing a substrate. Additionally, the method includes forming a first linear waveguide and a second linear waveguide in the substrate. The second linear waveguide is a substantially same structure as the first linear waveguide shifted by a distance. The method further includes masking a first region of the first linear waveguide and a second region of the second linear waveguide with repeated symmetry. Furthermore, the method includes implanting p-type impurity to the first region and the second region. The method then includes masking a third region of the first linear waveguide and a fourth region of the second linear waveguide with repeated symmetry. Moreover, the method includes implanting n-type impurity to the third region and the fourth region such that the third region interfaces with the first region to form a first PN junction in the first linear waveguide and the fourth region interfaces with the second region to form a second PN junction in the second linear waveguide. The second PN junction is substantially identical to the first PN junction.

In a specific embodiment, the method for balancing two arms of a Mach-Zhedner modulator includes forming a first ground electrode and a first source electrode respectively coupled to first region and the third region associated with the first PN junction. The method further includes forming a second ground electrode and a second source electrode respectively coupled to the second region and the fourth region associated with the second PN junction shifted with the distance away from the first PN junction. Furthermore, the method includes forming a third ground electrode shifted with the distance away from the second ground electrode beyond the second PN junction. The third ground electrode is commonly grounded with the first ground electrode and the second ground electrode such that each PN junction is subjected to an electric field imposed with a substantially same ground-source-ground pattern.

The present invention achieves these benefits and others in the context of known memory technology. However, a further understanding of the nature and advantages of the present invention may be realized by reference to the latter portions of the specification and attached drawings.

BRIEF DESCRIPTION OF THE DRAWINGS

The following diagrams are merely examples, which should not unduly limit the scope of the claims herein. One of ordinary skill in the art would recognize many other variations, modifications, and alternatives. It is also understood that the examples and embodiments described herein are for illustrative purposes only and that various modifications or changes in light thereof will be suggested to persons skilled in the art and are to be included within the spirit and purview of this process and scope of the appended claims.

DETAILED DESCRIPTION OF THE INVENTION

The present invention relates to silicon photonic devices and methods. Various embodiments of the present invention provide a silicon-based Mach-Zhedner modulator with balanced two arms. More specifically, the invention provides a Mach-Zhedner modulator including repeated p-n or n-p doping pattern to maintain balance for two modulation arms regardless of implant mask misalignment. In certain embodiments, the invention is applied for high bandwidth optical communication, though other applications are possible.

The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the Claims herein is not intended to invoke the provisions of 35 U.S.C. 112, Paragraph 6.

Please note, if used, the labels left, right, front, back, top, bottom, forward, reverse, clockwise and counter clockwise have been used for convenience purposes only and are not intended to imply any particular fixed direction. Instead, they are used to reflect relative locations and/or directions between various portions of an object.

Figures 1A, 1B:
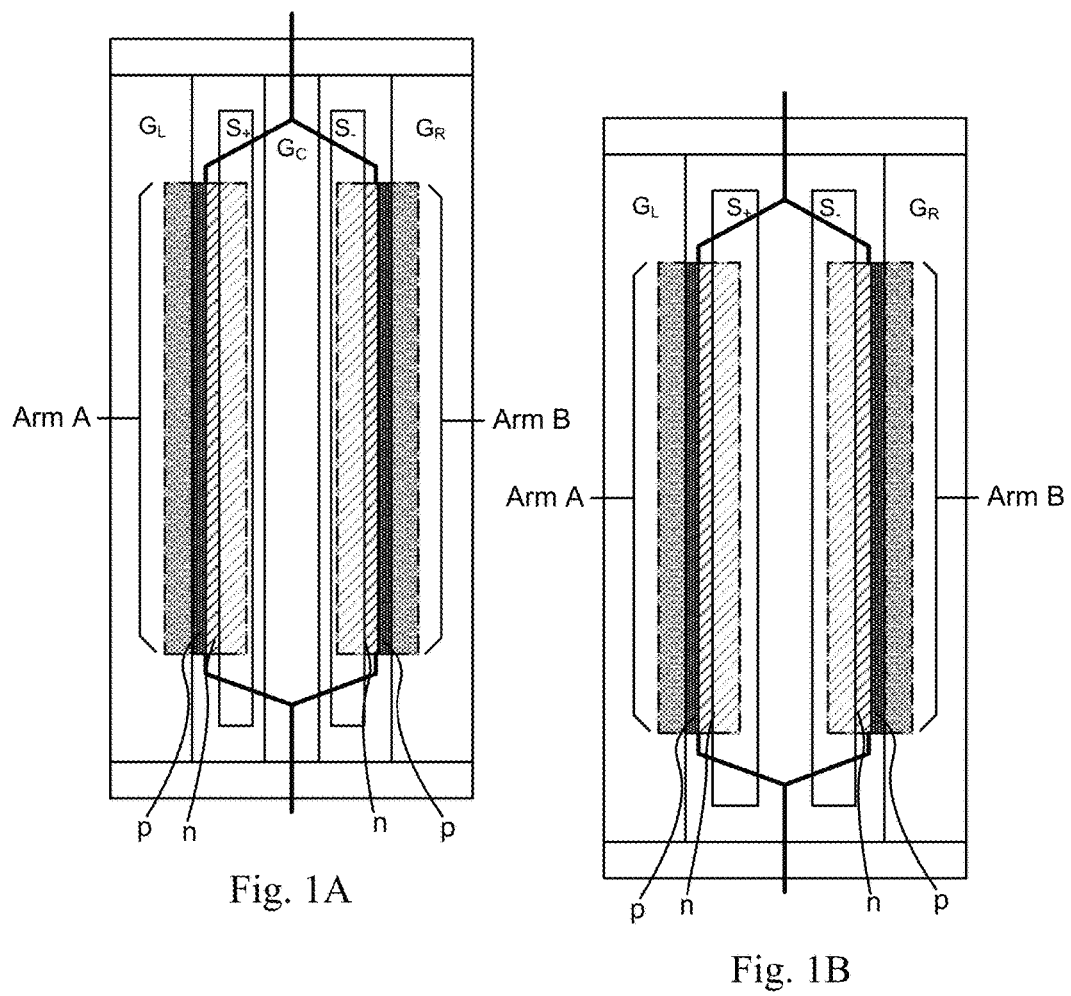
FIGS. 1A and 1B are a simplified diagram of typical Mach-Zhedner modulators with two arms formed by mirrored p-n implant masks.

FIGS. 1A-B are a simplified diagram of typical Mach-Zhedner modulators with two arms formed by mirrored p-n implant masks. Typical Mach-Zhedner (MZ) modulator within silicon photonic platform includes two identical Si-based waveguides, or Arms A and B. The two Si-based waveguides can be made of Si or SiN. Each waveguide includes a PN junction with a p-type region interfacing a n-type region along the whole arm length. The p-type region and the n-type region are formed by respectively doping p- or n-type electric impurity into pre-patterned waveguide material formed on a silicon-on-insulator (SOI) substrate. In one example, the p-type region of each PN junction is coupled to an electrode $G_L$ or $G_R$ at common ground level (V=0) and the n-type region of one PN junction (Arm A) is coupled to an source electrode S+ at positive bias level (V>0) while the n-type region of another PN junction (Arm B) is coupled to another source electrode S− at negative bias level (V<0). The electrode material can be metal or other conductive material overlying the corresponding p-type or n-type regions of each PN junction. When two waveguide arms, Arm A and Arm B, are paired to form the MZ modulator, a central electrode Gc, also at the ground level, is added between the two source electrodes S+ and S− but free from contact either source electrode or part of two PN junctions. Gc is disposed directly on the insulator layer of the silicon-on-insulator substrate. Adding central electrode Gc makes a same GSG pattern for each PN junction, forming a GSGSG five-electrode configuration bearing both mirrored and repeated symmetries around each of the two PN junctions. Further, the two PN junctions of Arm A and Arm B are disposed geometrically in a mirrored symmetric configuration, i.e., either in a p-n n-p or n-p p-n order.

In an application of using push-pull mechanism to drive the MZ modulator, bias voltages applied between the first source electrode S+ and ground electrode $G_L$ plus a central ground electrode $G_C$ to generate an electric field in GSG pattern for the Arm A. Similarly, bias voltages applied between the first source electrode S− and ground electrode $G_R$ plus the central ground electrode $G_C$ to generate an electric field in GSG pattern for the Arm B, which is mirrored symmetric to that of Arm A. The waveguide in Arm A or Arm B is configured to couple with an optical fiber. A beam of light, coming in an optical fiber, can be split into two by a power splitter and feed into corresponding two optical fibers coupled to the two waveguides, Arm A and Arm B. Accordingly, the phases of the beam of light can be properly modulated in those two arms due to electro-optic (EO) effect under the push-pull drive mechanism.

In another example, when two modulator arms Arm A and Arm B are paired to form the MZ modulator, no central electrode Gc is used. Therefore, on top of mirrored symmetric p-n n-p or n-p p-n junction configuration for each of the Arm A and Arm B, the associated four electrodes forms a GSSG mirrored symmetric configuration for the MZ modulator. Note, the doping process for forming the PN junction of each arm is typically done by impurity implantation with a precedent patterning or masking process. Usually p-type doping is done for both PN junctions but is separately done for n-type impurity doping. In the prior art, a pair of implant masks for p-type impurity doing is placed to expose corresponding p-type regions of the two arms of the MZ modulator with a designated mirrored symmetric layout. Similarly, another pair of implant masks for n-type doping is needed to expose corresponding n-type regions in order to form the required PN junctions. However, a drawback exists with the above design, since any misalignment of either n-type or p-type implant masks over corresponding regions on Arm A and Arm B would result in asymmetric p-n doping profile between the two arms of the MZ modulator, as seen in more detail below.

Figure 2A:
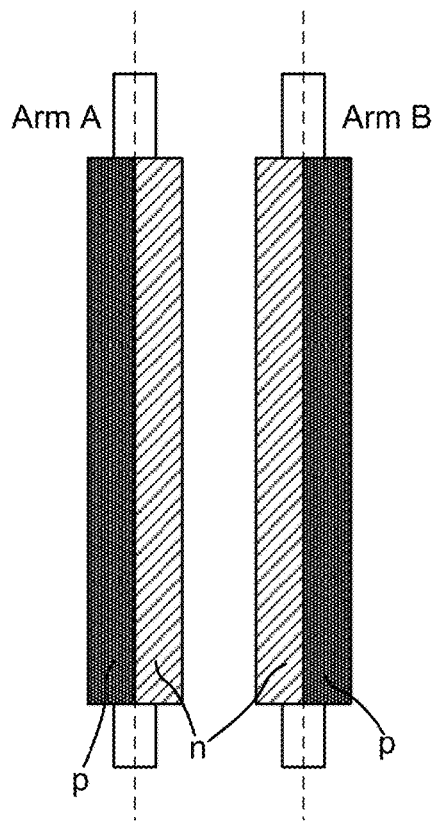
FIGS. 2A and 2B are a simplified diagram showing impact of implant mask misalignment on a Mach-Zhedner modulator with mirrored symmetric doping profile.
Figure 2B:
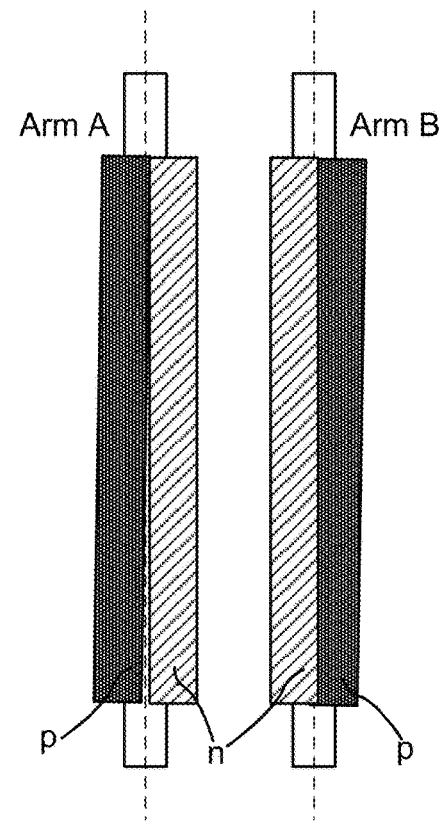

FIGS. 2A-B are a simplified diagram showing impact of implant mask misalignment on a Mach-Zhedner modulator with mirrored symmetric doping profile. To the left of the figure, a perfect alignment of implant masks is done before performing doping. That results in perfect mirror symmetric p-n n-p (or n-p p-n) doping profile so that Arm A and Arm B are identical. The MZ modulator with such pair of modulation arms is able to generate identical phase changes due to EO effect in the two arms (A and B), a desired result for utilizing push-pull drive mechanism.

However, to the right of the figure, a situation of misaligned implant masks is shown. For example, mask for p-type impurity implantation is slightly tilted and/or mask for n-type impurity implantation is slightly shifted. Any of such misalignment or imperfection of the implant masking would result in break-up of mirror symmetry of the doping profiles between Arm A and Arm B. Therefore, Arm A and Arm B are no longer identical, thereby modulation phase changes due to EO effect in Arm A and Arm B of the MZ modulator are not the same, an undesired result for utilizing push-pull drive mechanism. Since the mirrored symmetric configuration is sensitive to the p and n implant masks alignment, improvement on modulation arms configuration is needed.

Figure 3:
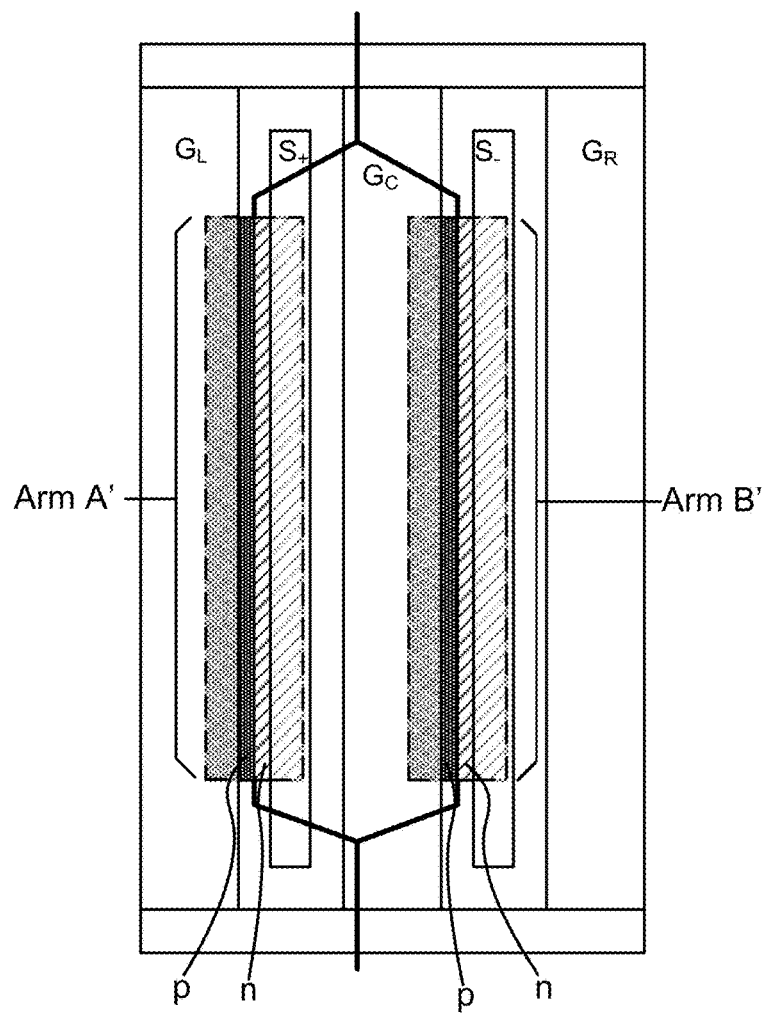
FIG. 3 is a simplified diagram of a Mach-Zhedner modulator with repeated p-n doping profile associated with two arms according to an embodiment of the present invention.

FIG. 3 is a simplified diagram of a Mach-Zhedner modulator with repeated p-n doping profile associated with two arms according to an embodiment of the present invention. This diagram is merely an example, which should not unduly limit the scope of the claims. One of ordinary skill in the art would recognize many variations, alternatives, and modifications. As shown, a repeated, not mirrored, symmetric p-type and n-type implant masks are provided. When the corresponding implant masks in repeated symmetric pattern are utilized for doping p-type or n-type impurities in the two silicon-based waveguides, two PN junctions with repeated symmetry are formed. The implantation process is performed for doping p-type impurity at one time into corresponding p-type regions of both waveguides based on the p-type implant masks with repeated symmetry. Then, the implantation process is performed for doping n-type impurity at another time into corresponding n-type regions of both waveguides based on the n-type implant masks with repeated symmetry.

Additionally, to form two balanced modulator arms with repeated symmetry, the corresponding electrode setting is also required to be formed in repeated symmetric pattern. Particularly for the embodiment shown in FIG. 3, a five-electrode GSGSG configuration in a direction across the two modulator arms is utilized. As shown, at least from one direction across the two modulator arms, a first part of a common ground electrode, $G_L$, is disposed to couple with the p-type (or n-type) region of a first PN junction of a first modulator arm (e.g., Arm A') followed by a first source electrode (S+) disposed to couple with the n-type (or p-type) region the same PN junction of the same modulator arm. Further along this direction, a second part of the common ground electrode ($G_C$) and a second source electrode (S−) are disposed in repeated symmetry to couple respectively with the second PN junction of the second modulator arm (e.g., Arm B'), followed by a third part of the common ground electrode ($G_R$). The second part of the common ground electrode, namely a central ground electrode ($G_C$), of course has a spacing away from the first PN junction and similarly in a repeated symmetry the third part of the common ground electrode has a spacing away from the second PN junction. The three parts of common ground electrode are at a same grounded state (V=0) while the first source electrode and the second source electrode are biased to a voltage having a same value but opposite in positive/negative polarity. In this way, each modulation arm, Arm A' or Arm B', is subjected to same alternating electric field induced by the bias voltages applied via GSG electrodes in repeated symmetric configuration. Detail illustration is shown below about how this repeated symmetry in the formation of both the two PN junctions and overlying electrodes improves the balance of two arms of the MZ modulator.

Figure 4A:
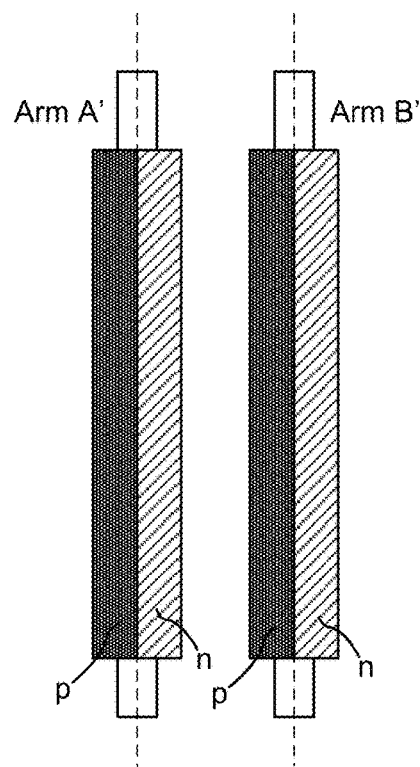
FIGS. 4A and 4B are a simplified diagram showing impact of implant mask misalignment on a Mach-Zhedner modulator with repeated symmetric doping profile according to an embodiment of the present invention.
Figure 4B:
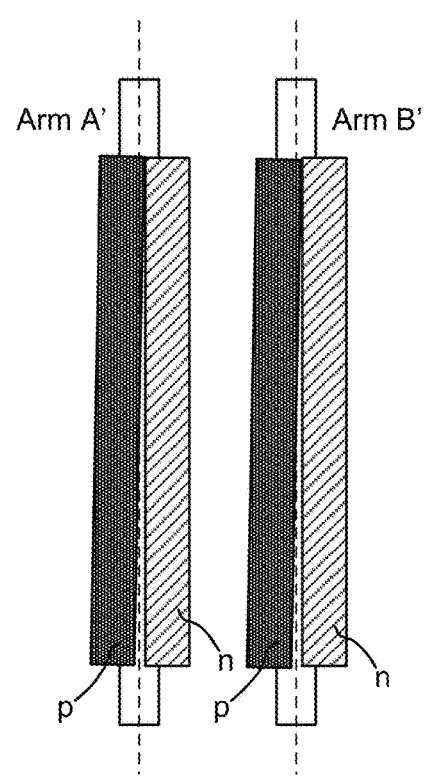

FIGS. 4A-B are a simplified diagram showing impact of implant mask misalignment on a Mach-Zhedner modulator with repeated symmetric doping profile according to an embodiment of the present invention. This diagram is merely an example, which should not unduly limit the scope of the claims. One of ordinary skill in the art would recognize many variations, alternatives, and modifications. As shown, to the left of the figure, p-type and n-type implant masks are perfectly aligned in Arm A' and Arm B'. Of course, there will be no issue at all since the p-n doping profiles of the Arm A' and Arm B' are identical in this situation and the resulted phase changes the two arms of MZ modulator are also identical. Alternative, to the right of the figure, a scenario of misaligned implant masks is shown. However, since either p-type implant mask or n-type implant mask is repeatedly applied to Arm A' and Arm B', any misalignment or shifting relative to a central line of each arm is still repeated for both Arm A' and Arm B'. Therefore, corresponding p-n doping profiles associated with both Arm A' and Arm B', although not perfect by itself, remain identical among each other. Accordingly, the modulation phase changes due to EO effect in both Arm A' and Arm B' of a MZ modulator are still physically identical. Thus the push-pull drive mechanism can be implemented without being affected by the manufacture imperfection.

Similarly, the electrodes coupled with the p or n regions of each PN junction can be formed with repeated symmetry. Metal or other conductive materials can be deposited or plated onto pre-patterned regions for either grounded electrode or source electrode with repeated symmetry for the two arms of the MZ modulator. Though not shown in FIG. 4, the results would be similar to the formation of PN junctions as manufacture process is much easier to achieve repeated symmetric patterns than creating mirrored symmetric patterns.

Figure 5:
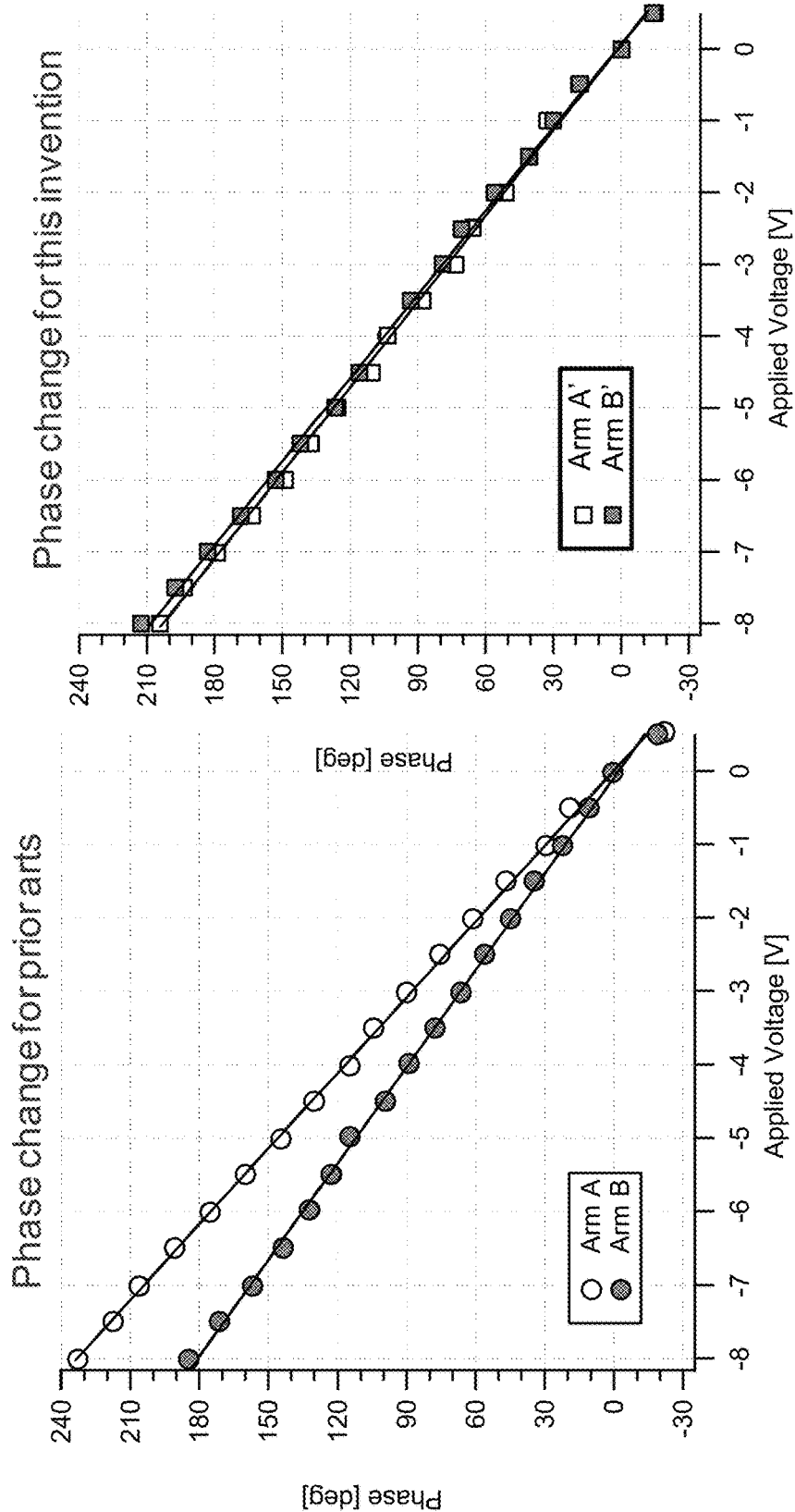
FIG. 5 is a simplified diagram showing comparison of phase changes due to EO effect in two arms of a Mach-Zhedner modulator with mirrored symmetric doping profile according to a prior art versus a Mach-Zhedner modulator with repeated symmetric doping profile according an embodiment of the present invention.

FIG. 5 is a simplified diagram showing comparison of phase changes due to EO effect in two arms of a Mach-Zhedner modulator with mirrored symmetric doping profile according to a prior art versus a Mach-Zhedner modulator with repeated symmetric doping profile according an embodiment of the present invention. This diagram is merely an example, which should not unduly limit the scope of the claims. One of ordinary skill in the art would recognize many variations, alternatives, and modifications. As shown, the phase changes of Mach-Zhedner modulator are substantially linear over the applied bias voltages. To the left part of the figure, phase changes of two arms of a MZ modulator with mirrored symmetric doping profile are plotted. Due to broken symmetry caused by manufacture misalignment or imperfect doping profile variations, the PN junction in one arm (Arm A) is no longer identical to that of another arm (Arm B). This results in a reduced slope of the linear plot for the phase change of Arm B.

On the other hand, to the right part of the figure, the phase changes of a MZ modulator with two arms in repeated symmetric doping profile according to an embodiment of the present invention are plotted against the applied bias voltages, keeping substantially the same linear relation for the two arms, Arm A' and Arm B'. The repeated symmetry of the PN junctions for the two arms is not affected at all by any misalignment of corresponding p-type or n-type implant mask and resulted imperfect doping profiles within each arm, either Arm A' or Arm B'. In other words, the PN junction in Arm A' remains identical to that in Arm B'. When a beam of light is split into the two arms, phase changes in Arm A' and Arm B' are the same so that the push-pull phase modulation mechanism can be properly executed for the MZ modulator.

While the above is a full description of the specific embodiments, various modifications, alternative constructions and equivalents may be used. Therefore, the above description and illustrations should not be taken as limiting the scope of the present invention which is defined by the appended claims.

What is claimed is:

1. A Mach-Zehdner (MZ) modulator comprising:
   a first waveguide of a length comprising a first p-type side joined with a first n-type side on a substrate;
   a second waveguide of the length comprising a second p-type side joined with a second n-type side, the second waveguide being disposed side-by-side parallel to the first waveguide on the substrate having respective sides in p-n p-n or n-p n-p order;
   a first electrode and a second electrode respectively coupled to the first p-type side or the first n-type side;
   a third electrode and a fourth electrode respectively coupled to the second p-type side or the second n-type side, the third electrode and the first electrode being coupled to a common ground, the second electrode being located between the first electrode and the third electrode; and
   a fifth electrode disposed outside the second waveguide more distal to the first waveguide, wherein the second electrode and the fourth electrode are source electrodes respectively located between the first electrode and the third electrode and between the third electrode and the fifth electrode, thereby having the first waveguide and the second waveguide subjected to a substantially same electric field varied in a ground-source-ground pattern.

2. The MZ modulator of claim 1 wherein the first p-type side of the first waveguide and the second p-type side of the second waveguide are in parallel to each other, the first n-type side of the first waveguide and the second n-type side of the second waveguide are in parallel to each other.

3. The MZ modulator of claim 1 wherein the first waveguide and the second waveguide are made of Si or SiN patterned within the substrate.

4. The MZ modulator of claim 1 wherein the second electrode and the fourth electrode are source electrodes alternatively set at a positive and a negative bias voltage or vice versa relative to ground.

5. The MZ modulator of claim 1 further comprising a power splitter to split a beam of light via a first optical fiber and a second optical fiber respectively coupled into the first waveguide and the second waveguide.

6. The MZ modulator of claim 5 wherein the first waveguide is configured to provide a first phase modulation to a first split portion of the beam of light driven by electric field through a first voltage biased at the second electrode sandwiched by the first electrode and the third electrode commonly in ground, the second waveguide is configured to provide a second phase modulation to a second split portion of the beam of light driven by electric field imposed a second voltage biased at the fourth electrode sandwiched by the third electrode and the fifth electrode commonly in ground.

7. The MZ modulator of claim 6 wherein the first voltage and the second voltage are equal in value but alternative in polarity.

8. The MZ modulator of claim 6 wherein the beam of light is an output of a laser source.

9. A method for manufacturing a linear Mach-Zehnder modulator with balanced arms, the method comprising:
providing a substrate;
forming a first linear waveguide and a second linear waveguide in parallel in the substrate, the second linear waveguide being separated from the first linear waveguide in width direction;
forming a first PN junction by doping p-type dopants and n-type dopants respectively to two sides in length direction of the first linear waveguide;
forming a second PN junction by doping p-type dopants and n-type dopants respectively to two sides in length direction of the second linear waveguide to have a repeated p-n p-n or n-p n-p doping profile;
forming a first electrode and a second electrode to couple with the first PN junction and forming a third electrode and a fourth electrode separately to couple with the second PN junction; and
forming a fifth electrode beyond a side of the second linear waveguide distal to the first linear waveguide, the fifth electrode being commonly grounded with both the first electrode and the third electrode, the second electrode and the fourth electrode are source electrodes respectively located between the first electrode and the third electrode and between the third electrode and the fifth electrode for imposing a substantially same electric field varied in a ground-source-ground pattern across each of the first PN junction and a second PN junction.

10. The method of claim 9 wherein forming the first linear waveguide and the second linear waveguide comprise patterning, depositing, or doping Si or SiN within the substrate.

11. The method of claim 9 wherein forming the first PN junction and the second PN junction comprising implanting p-type/n-type impurity into a first side region in each of the first linear waveguide and the second linear waveguide at a first time followed by implanting n-type/p-type impurity to a second side region in each of the first linear waveguide and the second linear waveguide at a second time, wherein the second side region of the first linear waveguide is at least partially joined with the first side region of the first linear waveguide along a length direction, wherein in a repeated symmetry relative to the first linear waveguide the second side region of the second linear waveguide is at least partially joined with the first side region of the second linear waveguide along the length direction.

12. The method of claim 11 wherein forming a first electrode and the second electrode comprises coupling the first electrode to the first side region of the first linear waveguide and coupling the second electrode to the second side region of the first linear waveguide.

13. The method of claim 11 wherein forming a third electrode and a fourth electrode comprises coupling the third electrode to the first side region of the second linear waveguide and coupling the fourth electrode to the second side region of the second linear waveguide.

14. A method for balancing two arms of a Mach-Zehnder modulator, the method comprising:
providing a substrate;
forming a first linear waveguide and a second linear waveguide in parallel in the substrate, the second linear waveguide being shifted from the first linear waveguide in a direction perpendicular to the first linear waveguide;
masking a first side region of the first linear waveguide and a second side region of the second linear waveguide respectively with a first pattern and a second pattern, the second pattern being a copy of the first pattern;
implanting p-type impurity through the first pattern and the second pattern to form a first p-type side region of the first linear waveguide and a second p-type side region of the second linear waveguide having a substantially same shape;
masking a third side region of the first linear waveguide and a fourth side region of the second linear waveguide respectively with a third pattern and a fourth pattern, the fourth pattern being a copy of the third pattern;
implanting n-type impurity through the third pattern and the fourth pattern to form a third n-type side region of the first linear waveguide and a fourth n-type side region of the second linear waveguide having a substantially same shape, wherein the third n-type side region at least partially joins with the first p-type side region to form a first PN junction in the first linear waveguide and the fourth n-type side region at least partially joins with the second p-type side region to form a second PN junction in the second linear waveguide, wherein the first PN junction and the second PN junction comprise repeated p-n p-n doping profile;
forming a first electrode and a second electrode respectively coupled to first side region and the third side region associated with the first PN junction;
forming a third electrode and a fourth electrode respectively coupled to the second side region and the fourth side region associated with the second PN junction, the third electrode and the fourth electrode being respectively shifted from the first electrode and from the second electrode; and
forming a fifth electrode at a position shifted from the third electrode beyond the second PN junction, the fifth electrode being commonly grounded with both the first electrode and the third electrode, the second electrode and the fourth electrode being source electrodes respectively located between the first electrode and the third electrode and between the third electrode and the fifth electrode for imposing a substantially same electric field varied in a ground-source-ground pattern across each of the first PN junction and a second PN junction.

15. The method of claim 14 wherein the first linear waveguide and the second linear waveguide comprise Si or SiN patterned within the substrate.

16. The method of claim 14 wherein forming a fifth electrode comprises forming a combination of the third electrode, the fourth electrode, and the fifth electrode in a repeated symmetry of a combination of the first electrode, the second electrode and the third electrode.

17. The method of claim 14 wherein the second electrode and the fourth electrode are configured to be biased with a same voltage level but opposite in polarity relative to ground.

* * * * *